July 6, 1954 W. A. ROEDERER 2,683,008
FISHING ROD HOLDER
Filed Aug. 25, 1950
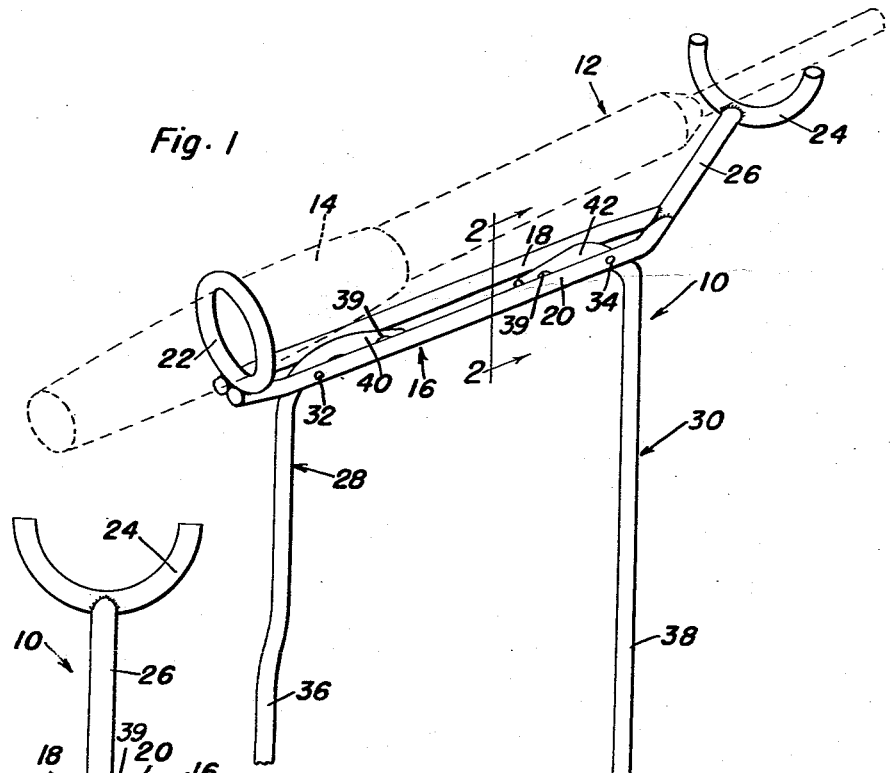
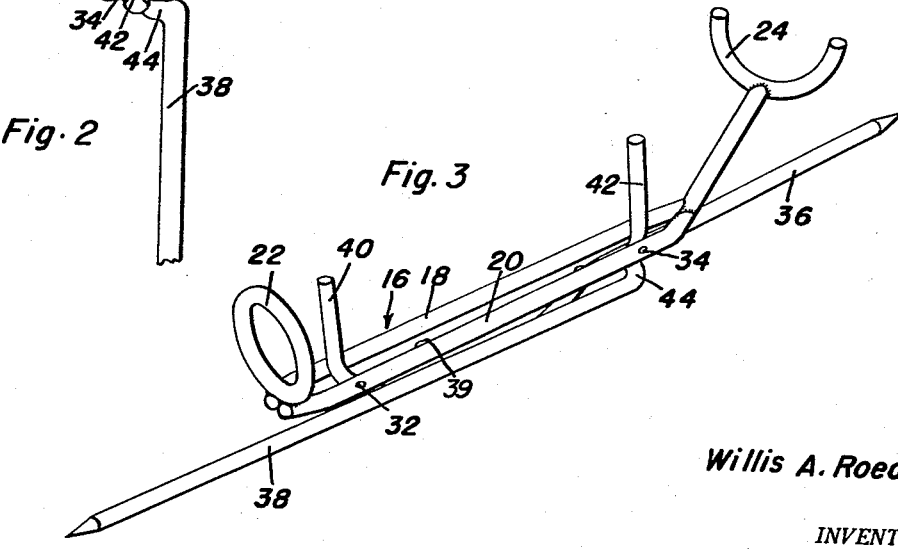
Willis A. Roederer
INVENTOR.

Patented July 6, 1954

2,683,008

UNITED STATES PATENT OFFICE 2,683,008

FISHING ROD HOLDER

Willis A. Roederer, Byesville, Ohio

Application August 25, 1950, Serial No. 181,448

1 Claim. (Cl. 248—42)

This invention comprises novel and useful improvements in a fishing rod holder and more specifically pertains to an inexpensive, lightweight, collapsible fishing rod holder which may be readily folded into collapsed position for convenient storage in a fishing tackle box.

The primary object of this invention is to provide an improved, lightweight, inexpensive, foldable or collapsible fishing rod holder.

A further object of the invention is to provide a fishing rod holder in conformity with the foregoing object which may be fabricated entirely from such inexpensive material as metallic wires or rods or a suitable plastic.

Yet another object of the invention is to provide an improved fishing rod holder in compliance with the preceding objects in which greatly increased strength, rigidity and security in the assembled position is provided.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view showing one embodiment of fishing rod holder incorporating therein the principles of this invention, the same being illustrated in its open or operative position, the manner in which a fishing rod is supported thereby being indicated in dotted lines therein;

Figure 2 is a vertical transverse sectional view taken substantially upon the plane indicated by the section line 2—2 of Figure 1; and, Figure 3 is a perspective view of the holder in its collapsed or folded position.

Referring now more specifically to the accompanying drawings, wherein like numerals designate similar parts throughout the various views, it will be seen that the improved fishing rod holder forming the subject of this invention is indicated generally by the numeral 10 and in Figure 1 is shown for supporting a fishing rod indicated generally by the numeral 12 and having a handle 14.

The holder includes an elongated base 16 which may conveniently comprise a pair of substantially parallel metallic rods or wires 18 and 20, which are terminally connected to each other as by welding or the like, and which have attached thereto in a similar manner a ring 22 and a yoke 24 having a stem 26. As illustrated in Figure 1, the handle portion 14 of the fishing rod is adapted to be received within the ring 22, while the adjacent portion of the fishing rod rests upon the yoke 24.

The base 16 thus is medially slotted by virtue of the space between the parallel rods or wires 18 and 20, and adjacent the ends of the base and within the slot there are pivoted a pair of leg members 28 and 30 as by pivot pins 32 and 34, respectively.

Each of the leg members is of L-shaped construction, the legs being of equal length, the longer legs indicated at 36 and 38 being adapted to be embedded in the ground or the like in order to firmly anchor and position the fishing rod holder. The shorter legs indicated at 40 and 42 are disposed for pivotal movement such that when the legs are in their open position as shown in Figure 1, the short leg portions 40 and 42 will be received and guided between the side members 18 and 20 of the slotted base 16. These short leg portions thus are braced within the slot of the base and serve to rigidify the assembly. At least one of the legs, such as that at 30, has its longer leg portion provided with a horizontal offset portion 44, see Figure 2, which is so arranged that when the leg is in its open position, this horizontal portion or shoulder portion is adapted to underlie and abut one of the base rod members such as 20. Thus, in open position of the leg, the base will rest directly upon this horizontal portion.

This construction has the further advantage that in the folded position of the device as shown in Figure 1, the two long portions of the legs when folded towards each other will be disposed in side by side arrangement rather than both lying within the slot of the base.

If desired, the other leg portion might be similarly provided with a horizontal shoulder disposed in opposite direction for engagement with the other base member 18.

It will thus be readily apparent that there has been provided an extremely simple, inexpensive and lightweight construction of holder which may be readily collapsed as shown in Figure 3 for compact and easy storage; will be highly efficient to support in a secure and stationary manner a fishing rod; and in the open position will have its legs well braced and rigid with respect to the base 16.

One or both of the rods 18, 20 may be and are preferably provided upon their inside or adjacent surfaces with lateral projections 39, see Figure 2 particularly, which bear against the short leg portions 40, 42 to assist in maintaining the legs in their open position.

From the foregoing, the construction and operation of the device together with its many advantages will be readily apparent and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having thus described the invention, what is claimed as new is:

A collapsible fishing rod holder comprising an elongated base, a ring and a yoke constituting fishing rod supports at opposite ends of said base, support legs pivoted to said base adjacent to and inwardly from opposite ends, said legs being foldable toward one another, one of said legs being offset adjacent its pivotal connection to the base, said offset portion engaging a side of said base in the open position of the legs, said base being medially slotted, each leg comprising an L-shaped member, one portion of each leg being received within said slot when the legs are in their open position, said base consisting of parallel rods terminally connected to each other and to said supports, one of said rods having a pair of spaced projections thereon between the pivot points of the legs and extending toward the other rod, said projections bearing against the leg portions received within the slot when the legs are in open position for retaining the legs in open position.

References Cited in the file of this patent

UNITED STATES PATENTS

| Number | Name | Date |
| --- | --- | --- |
| 1,435,738 | Reiman | Nov. 14, 1922 |
| 1,812,967 | Long | July 7, 1931 |
| 2,075,398 | Kunath | Mar. 30, 1937 |
| 2,137,645 | Doench | Nov. 22, 1938 |
| 2,466,166 | Fischer | Apr. 5, 1949 |
| 2,543,569 | Dusatko | Feb. 27, 1951 |
| 2,593,789 | Pearson | Apr. 22, 1952 |

FOREIGN PATENTS

| Number | Country | Date |
| --- | --- | --- |
| 1,570 | Australia | Apr. 27, 1926 |
| 578,361 | Great Britain | June 25, 1946 |